United States Patent

Allen et al.

[15] 3,685,027

[45] Aug. 15, 1972

[54] DYNAMIC MOS MEMORY ARRAY CHIP

[72] Inventors: Charles A. Allen, Poughkeepsie; Donald F. Lund, Hyde Park, both of N.Y.

[73] Assignee: Cogar Corporation, Wappingers Falls, N.Y.

[22] Filed: Aug. 19, 1970

[21] Appl. No.: 65,197

[52] U.S. Cl. .........340/173 R, 340/173 CA, 307/238, 307/246

[51] Int. Cl. ..........................G11c 11/24, G11c 11/40

[58] Field of Search .........340/173 CA, 173 R; 320/1; 307/238, 246

[56] References Cited

UNITED STATES PATENTS

| | | | |
|---|---|---|---|
| 3,387,286 | 6/1968 | Dennard | 340/173 |
| 3,541,530 | 11/1970 | Spampinato | 340/173 |
| 3,576,571 | 4/1971 | Booher | 340/173 |

*Primary Examiner*—Terrell W. Fears
*Attorney*—Harry M. Weiss

[57] ABSTRACT

A dynamic MOS memory array chip is disclosed which utilizes four-device cells. During the refresh cycle, all of the bit/sense line pairs are gated to a charging potential and all of the word lines are pulsed simultaneously so that all cells in the array can be refreshed together. The refresh pulse level applied to all of the word lines is lower than the select pulse level applied to any one of the word lines during a read or write operation.

39 Claims, 8 Drawing Figures

INVENTORS
CHARLES A. ALLEN
DONALD F. LUND
BY Amster & Rothstein
Harry M. Weiss
ATTORNEYS

PATENTED AUG 15 1972

3,685,027

SHEET 2 OF 5

DYNAMIC MOS MEMORY ARRAY CHIP

This invention relates to semiconductor arrays, and more particularly to dynamic MOS memory array chips.

The design of MOSFET (metal-oxide-semiconductor field-effect transistor) memories (hereinafter referred to as MOS memories) has taken two approaches. In the case of static MOS cell arrays, each cell is generally a cross-coupled flip-flop in which two additional MOS devices are utilized as load "resistors" and another two MOS devices gate the cell nodes to the bit lines. The sequence of functions performed on each chip during a read or write cycle is similar to that performed on a bipolar memory chip.

Dynamic MOS cells, on the other hand, are not provided with load "resistors." One of the two nodes in each cell is charged by logic transistors; the capacitance at the node then holds the voltage. Because leakage currents do exist, however, "refresh" signals must be applied to the cells periodically. Dynamic MOS memory arrays offer the advantages of greater speed and reduced chip areas.

In some prior art dynamic MOS memories, all of the cells in the array have been refreshed at the same time. However, such arrays have generally required six devices for each cell: two cross-coupled devices, two gating devices connected to the bit lines, and two "load" devices. The two latter devices are similar to those used in static systems except that they are not gated on continuously. Rather than to supply a trickle charge so that periodic refreshing is not necessary, the two "loads" function as gates to recharge one of the two cell nodes. All of the cells in the array can be refreshed simultaneously simply by gating on all of the load devices at the same time. (Because these devices function as gates, rather than load resistors, their size can be reduced considerably from the true load devices found in static arrays.) One of the major shortcomings with arrays of this type is that six devices are required for each cell.

There are several four-device cell dynamic arrays, and even three-device cell dynamic arrays have been designed. However, with respect to these arrays it is necessary to sequentially refresh the cells in individual word lines. The major disadvantages of these systems are that the address lines must be selectively interfaced with the refresh addresses, and the time required to refresh an entire memory is the summation of all of the refresh cycles and therefore is excessively long.

It is a general object of our invention to provide a four-device cell dynamic MOS memory array in which all cells in the array can be refreshed simultaneously.

It is another object of our invention to provide a four-device cell dynamic MOS memory array in which all cells in a column (bit line) can be refreshed simultaneously. (It is because all of the cells in a bit line can be refreshed at the same time that all of the cells in the entire array can be refreshed simultaneously.)

It is another object of our invention to provide a dynamic MOS memory cell array in which all cells can be refreshed simultaneously, but for which a refresh operation is required during only widely separated system cycles.

In accordance with the principles of our invention, a single word line conductor is associated with each row of four-device cells, and a pair of bit/sense line conductors is associated with each column of cells — as in the prior art. Each cell consists of a pair of cross-coupled devices and two gating devices. Each of the gating devices has its source and drain connected between one of the nodes of the cross-coupled pair and one of the bit/sense conductors. The word line is coupled to the gate of each of these two devices. All of the bit/sense line pairs are connected through respective gates to two output conductors which are extended to a bit driver/sense amplifier associated with the array. To select a particular cell, a positive potential is applied to the respective word line (all potential levels referred to herein pertain to the n-channel device types utilized in the illustrative embodiment of the invention), and the gates in the pair of respective bit/sense conductors are turned on. A cell is read by sensing the differential currents appearing in the output conductors, and a bit can be written into a cell by forcing the two output conductors to opposite levels.

Each of the bit/sense line conductors is connected to the source of an additional gate device whose drain is connected to a positive potential. The gate of each of the additional gate devices is extended to a "restore" conductor. When this conductor is pulsed, each of the gate devices turns on. At the same time, in accordance with the principles of our invention, all of the word lines are pulsed simultaneously. Currents flow through the bit/sense line conductors and through the two gate devices in each of the four-device cells to recharge the node capacitance which discharged since the last refresh cycle. In this way all of the cells are refreshed simultaneously simply with the provision of an additional pair of gates for each bit line. (In the event it is desired to refresh all of the cells in a particular column, as opposed to all of the cells in the entire array, all that is required is to gate on the two additional devices in the respective bit line while the other devices are held off.)

As will be described below, there are certain difficulties with this approach. One of the difficulties relates to the fact that large currents may flow through one or both of the additional gates in each of the bit/sense lines during the refresh cycle. These large currents result in a high level of power dissipation and may also cause the voltage on each of the bit/sense line conductors to fall to a level below the minimum voltage level required by the "off" active device in each cell. These and other problems are overcome by applying a potential to each of the word lines during a refresh operation which is lower than the potential applied during a read or write operation.

It is a feature of our invention to provide a pair of gates in each bit line of a four-device cell dynamic MOS memory array and to turn on these gates periodically to refresh all of the cells in the array.

It is another feature of our invention to control the refreshing of all cells in the array by pulsing all of the word lines simultaneously but at a level lower than that used for reading or writing.

Further objects, features and advantages of our invention will become apparent upon consideration of the following detailed description in conjunction with the drawing, in which.

Figure 1:
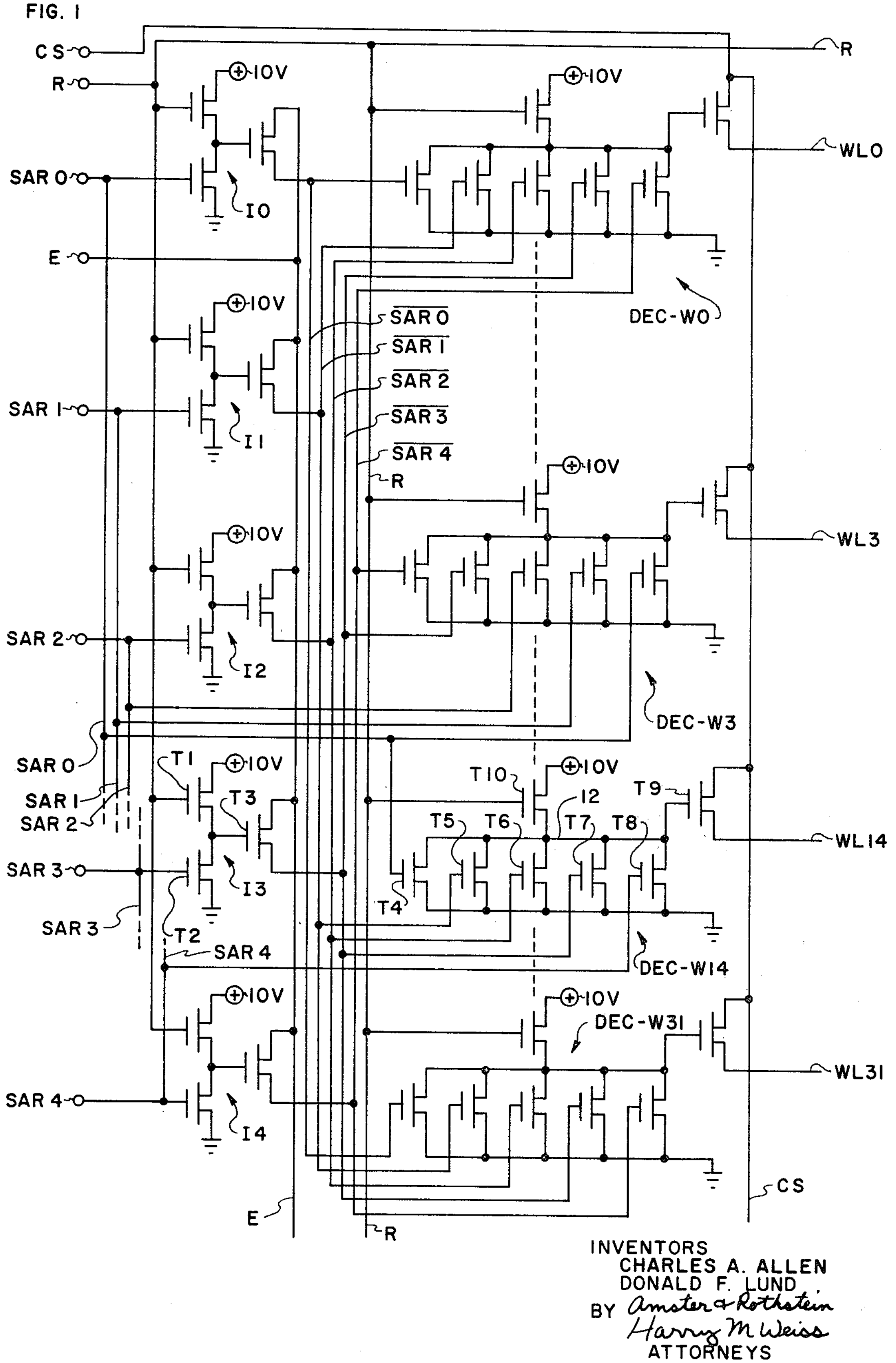
FIGS. 1–4 depict an illustrative array chip in accordance with the principles of our invention.
Figure 2:
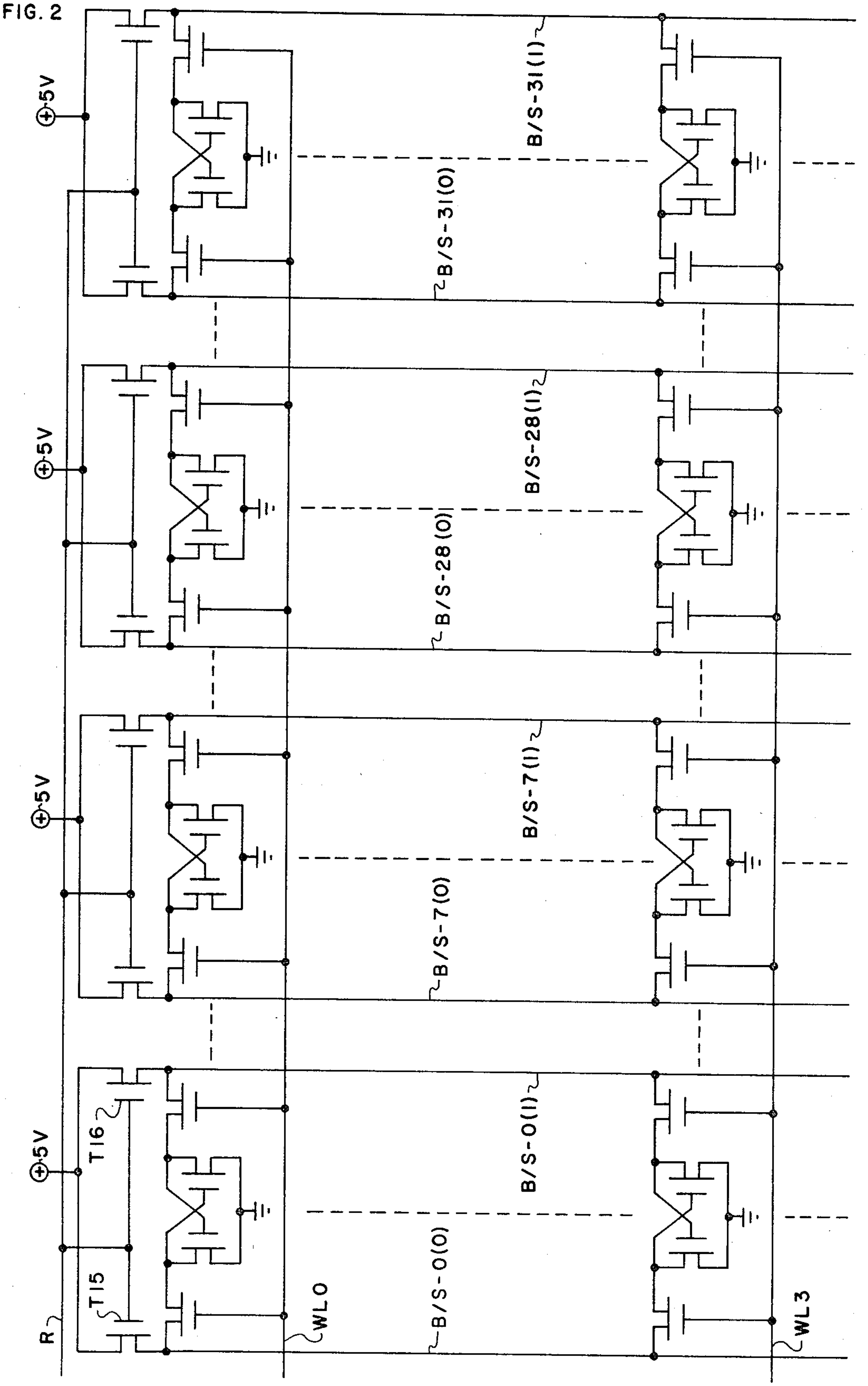
Figure 3:
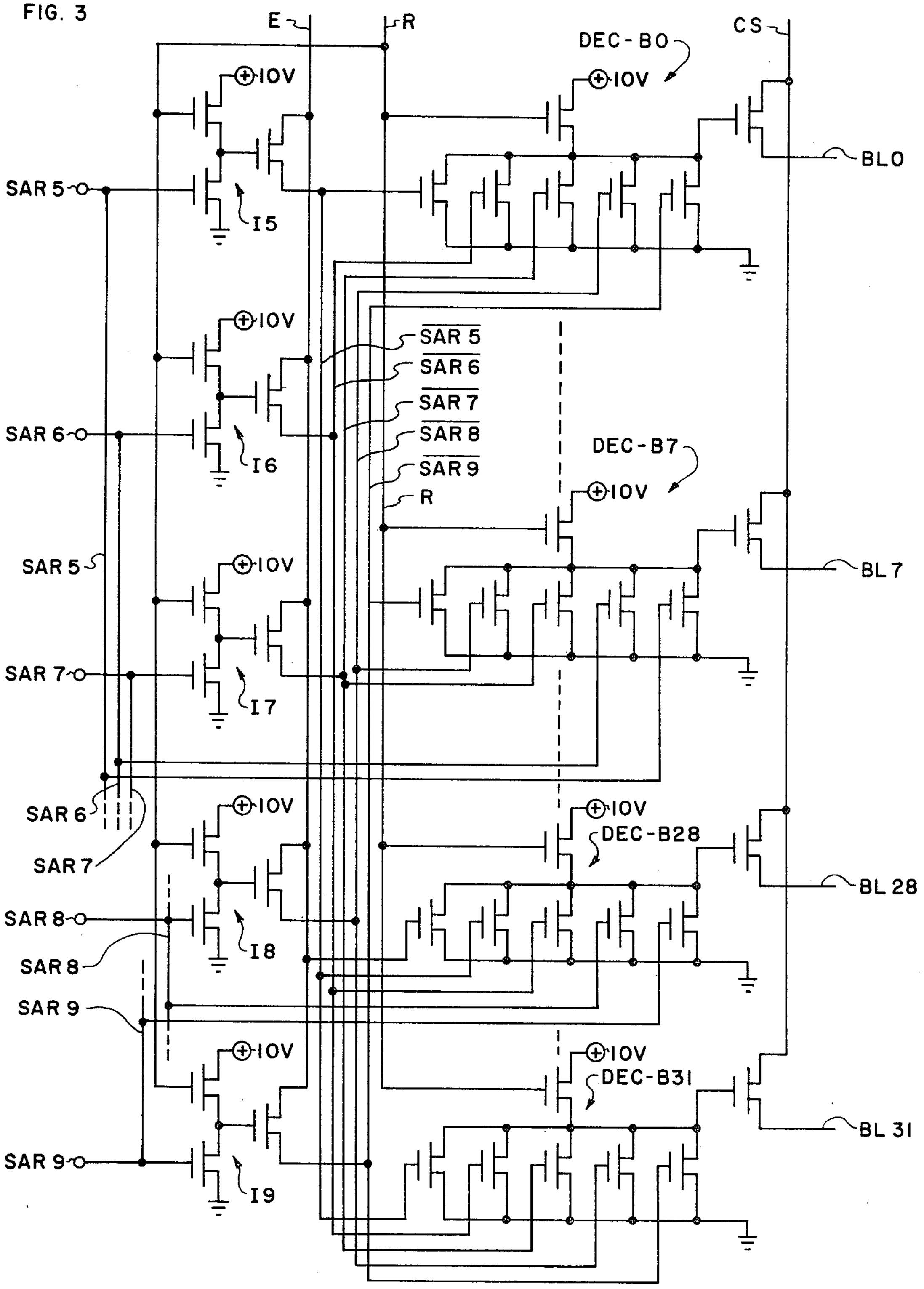
Figure 6:
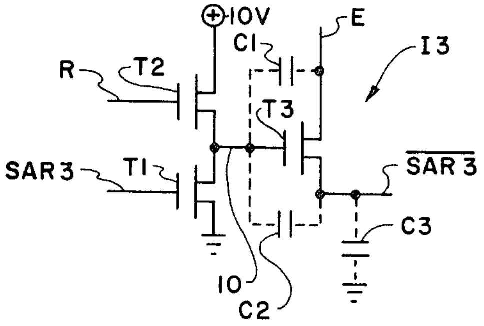
Figure 7:
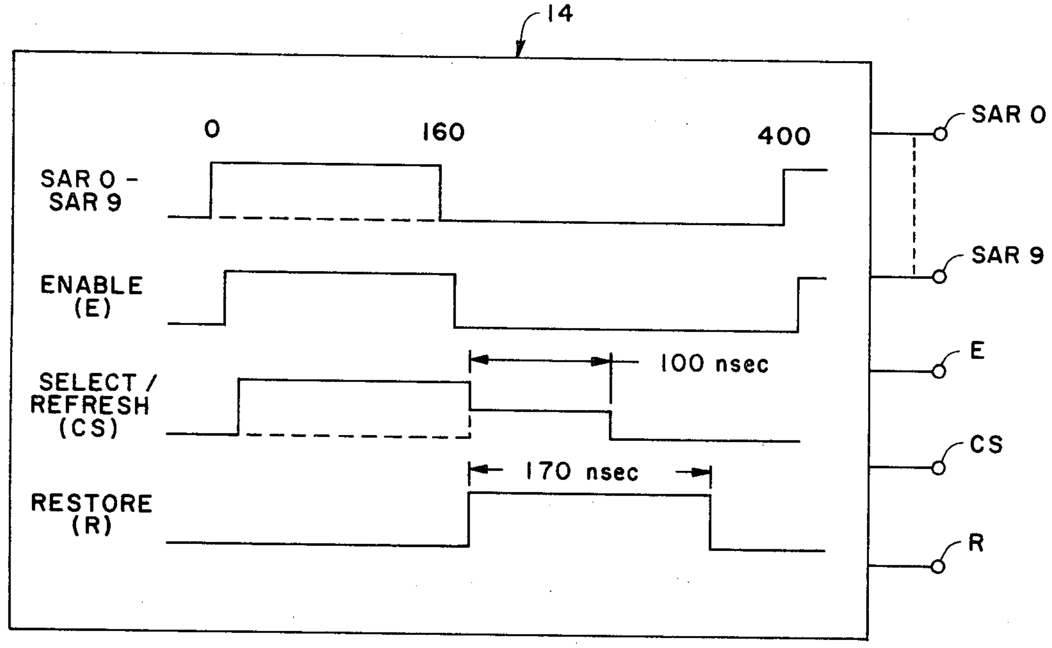
Figure 8:
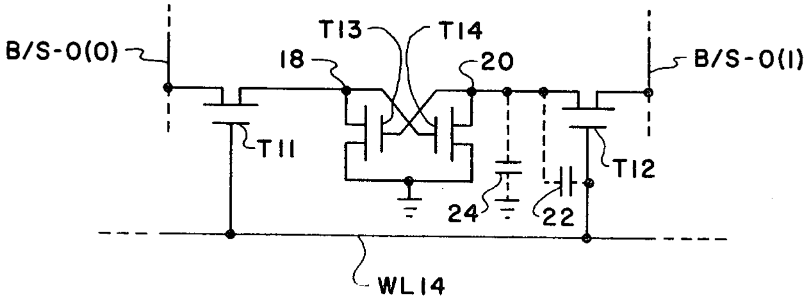

FIG. 6 will be helpful in understanding the operation of the inverter circuits on FIGS. 1 and 3;

FIG. 7 depicts symbolically a source of signals for the array chip of FIGS. 1–4; and FIG. 8 depicts some of the junction and stray capacitances associated with an individual cell.

The chief drawback of MOS circuits in semiconductor memories is their low gain-bandwidth compared with that of bipolar circuits using equivalent geometric tolerances. This shortcoming can be minimized by using bipolar circuits to provide the high-current drive to the MOS array circuits, and by using bipolar amplifier circuits to detect the low MOS sense currents. If the circuits are partitioned so that all of the devices on a given chip are either bipolar or MOS, no additional processing complexity is added by mixing the two device types within the same system. The use of bipolar support circuits also allows easy interfacing with standard bipolar logic signals; thus, the interface circuits can match standard interface driving and loading conditions.

The array chip of FIGS. 1–4 can be used to the best advantage with bipolar support circuits. The array chip is provided with three timing signals and a sufficient number of address bits to identify a particular one of the cells in the array. In the illustrative embodiment of the invention, the cells are organized in a 32 × 32 array and thus 10 address bits are required to identify one of the 1024 cells. The address signals are applied to terminals SAR0–SAR9. (Typically, the address bits are derived from Storage Address Registers, and thus the use of the notation SAR0–SAR9.) Three timing/control signals in the illustrative embodiment of the invention are applied to terminals R, E and CS.

FIG. 7 depicts schematically a circuit 14 for deriving the various address and control signals. The actual waveforms of the signals are depicted in the drawing. The derivation of address signals SAR0–SAR9 is standard in the art and conventional circuits can be used for this purpose. A circuit particularly advantageous for deriving the E (enable) and R (restore) control signals is disclosed in the copending application Ser. No. 65,225 of Andersen et al. entitled "Dynamic MOS Array Timing System," filed on Aug. 19, 1970. A particularly advantageous circuit for deriving the bi-level CS (select/refresh) signal is disclosed in the copending applivation of George K. Tu entitled "Bipolar Driver for Dynamic MOS Memory Array Chip," Ser. No. 65,226, filed on Aug. 19, 1970. Although the reference circuits are particularly suitable for use with the array chip of FIGS. 1–4, it is to be understood that the present invention is not limited for use with such circuits. The address and control signals depicted in FIG. 7 can be derived from any suitable bipolar chip (or chips), and even from any suitable MOS circuits.

Figure 4:
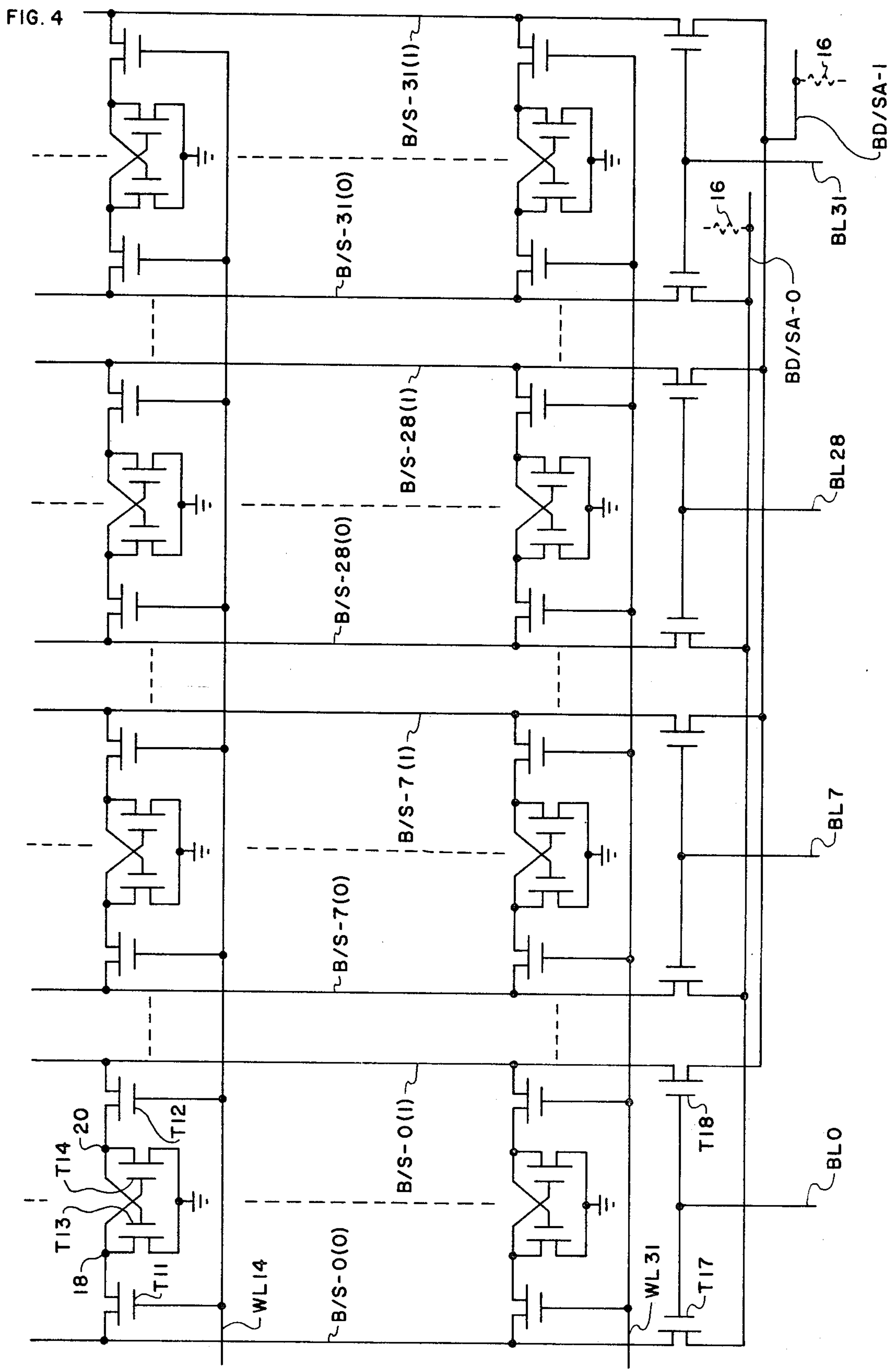
Figure 5:
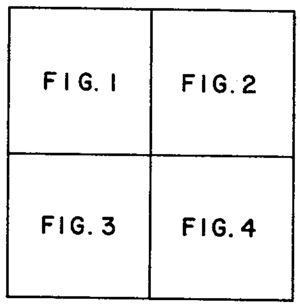
FIG. 5 shows the arrangement of FIGS. 1–4.

The two output conductors in the array chip, BD/SA–0 and BD/SA–1, are extended to bit driver/sense amplifier circuits on some other chip in the system. In FIG. 4, they are simply shown as being connected to hypothetical resistors 16. By these resistors it is intended to show that during a read operation differential currents flow through conductors BD/SA–0 and BD/SA–1 into the selected cell, the currents being derived through the two resistors. Depending on the relative polarities of the currents, the sense amplifier determines the state of the selected cell. On the other hand, during a write operation, the bit driver connected to the two output conductors forces one conductor to go low and the other to go high, thereby causing the selected cell to be placed in the proper state. The bit driver/sense amplifier circuit used with the array chip of FIGS. 1–4 does not form a part of the present invention, and any of many well known prior art circuits can be used as will be apparent to those skilled in the art.

The 1024 cells in the array are associated with the 32 word lines WL0–WL31 and the 32 bit lines BL0–BL31. Only four of the word lines and only four of the bit lines are shown in the drawing, together with the 16 cells at their intersections. A typical four-device cell, at the intersection of word line WL14 and bit line BL0 (bit line BL0 contains conductor pair B/S–0(0) and B/S–0(1), includes transistors T11, T12, T13 and T14. Transistors T13 and T14 are cross-coupled in a conventional manner and transistors T11 and T12 function as gates for connecting nodes 18 and 20 to bit/sense conductors B/S–0(0) and B/S–0(1). The gates of devices T11 and T12 are connected to word line WL14. To write a bit into the cell comprising devices T11–T14, a positive pulse is applied to word line WL14 to turn on gates T11 and T12. At the same time, a positive pulse is applied to bit line BL0 to turn on gates T17 and T18. When the two latter gates turn on, the bit/sense conductors in the first bit line are connected to the two output conductors. To write a 0 in the selected cell, the bit driver connected to the two output conductors applies a high potential to conductor BD/SA–0 and a low potential to conductor BD/SA–1. The high potential is extended through gate T17 and gate T11 to node 18. Since this node is connected to the gate of transistor T14, the transistor turns on. The ground potential extended from the source of the transistor to the drain of the transistor connected to node 20 keeps transistor T13 off since the gate of transistor T13 is connected to node 20. At the end of the write operation, node 18 is high and node 20 is low. Similarly, to write a 1 into the cell, conductor BD/SA–1 is made to go high while conductor BD/SA–0 is made to go low. In such a case, node 20 goes high and node 18 goes low.

To sense the state of the same cell, the same word and bit lines are energized. If the cell is in the 1 state, the low potential at node 18 allows a large current to flow from the sense amplifier through conductors BD/SA–0 and B/S–0(0) and devices T17, T11 and T13. Node 20, at a higher potential, allows less current to flow through conductors BD/SA–1 and B/S–0(1) and devices T18, T12 and T14. On the other hand, if the cell is in the 0 state, the opposite polarity currents flow through the two output conductors. In either case, the sense amplifier detects the relative polarities of the currents flowing through the two output conductors to determine the state of the cell.

In a similar manner, a bit can be written into any cell or can be read out of it simply by energizing the appropriate one of the word line conductors and the appropriate one of the bit line conductors. Whether a read or a write operation is performed is controlled by the bit driver and sense amplifier connected to the output conductors as is the practice in the art.

As is known in the art, the voltage on the drain of the "off" one of devices T13 and T14 gradually decreases due to unavoidable leakage. If the voltage falls below the minimum required to perform a non-destruct read operation, the information in the cell can be lost. It is for this reason that all of the cells are refreshed periodically.

This is accomplished with the used of additional gating devices T15 and T16 in bit/sense conductors BD/SA–0(0) and BD/SA–0(1). A similar pair of devices is provided for each of the 16 bit lines. The gates of all of the additional 64 devices are connected to conductor R. When this conductor is pulsed high, all of the gate devices turn on and current flows from the 5-volt source connected to the drain of the devices. The currents which flow through the bit/sense conductors recharge the node capacitances. For example, suppose that initially node 18 is at a high level and node 20 is at a low level. In such a case, transistor T14 is on and transistor T13 is off. Because transistor T13 is off, current flows through transistor T11 to recharge the capacitance at node 18. Because transistor T14 is on, the current which flows through transistor T12 does not charge the capacitance at node 20 and is instead shorted through transistor T14 to ground.

It is apparent that in order to refresh the cells in the array it is not necessary to turn on bit switches T17 and T18, or the other 31 bit switch pairs. All that is required is to gate on transistors T15 and T16, and the other 31 pairs of devices in the other 31 bit lines, while at the same time pulsing the 32 word lines. It is thus possible to refresh all cells simultaneously. (It is possible to refresh all of the cells in only one particular column, if this is desired, simply by pulsing the respective gate devices such as T15 and T16 to the exclusion of the other 31 pairs, although an arrangement for doing this is not shown in the drawing.)

The system includes five inverter circuits I0–I4 associated with the 32 word lines. The five address bits SAR0–SAR4 are extended to the inverter circuits, and the circuits develop the complementary signals. The true and complement signals are then extended to the appropriate ones of the 32 decoders DEC–W0 through DEC–W31. Only one of the 32 decoders operates during any read or write cycle so that only one of the 32 word lines is energized. In a similar manner, the five address bits SAR5–SAR9 are extended to inverters I5-I9. The true and complement signals are then extended to the appropriate ones of the decoders DEC–B0 through DEC–B31 so that a particular one of the 32 bit lines BL0–BL31 is energized during each read or write cycle.

The operation of the inverters and decoders can be understood with reference to particular circuits such as I3 and DEC–W14. Initially, as shown on FIG. 7, the address signals are all low and the restore (R) signal is similarly low. Initially, the gate of transistor T3 is high in potential (its node capacitance is charged). The fact that the gate is high in potential at the start of a cycle will be verified below. At the same time, the gate of each of the devices such as T9 connected to a word line or a bit line is similarly high in potential. (This assumed initial condition will also be verified below.) The enable (E) conductor is coupled to the drain of transistor T3. Although the gate of the transistor is high, signal E is low and thus a low potential is extended to conductor $\overline{SAR3}$. Even though conductor $\overline{SAR3}$ is connected to the gates of transistors in 16 of the word line decoders (such as the gate of transistor T7 in decoder DEC–W14), the transistors do not conduct and thus the potential on conductor 12 is not affected. In decoder DEC–W14, the gates of three of transistors T4–T8 are connected to three of the complemented address conductors ($\overline{SAR1}$, $\overline{SAR2}$ and $\overline{SAR3}$) and the gates of two of the transistors (T4 and T8) are connected directly to two of the input address conductors (SAR1 and SAR4). Since all of the address bits are initially low, as are all of the complement address conductors at the start of each cycle, none of transistors T4–T8 conducts and conductor 12 remains high.

With conductor 12 high, transistor T9 is gated on. But initially conductor CS is low in potential and thus a low potential appears on each of the word lines. Similar remarks apply to each of the bit line decoders and the bit lines.

At the start of each cycle, some of the address lines go high in potential. In the illustrative embodiment of the invention, of word address bits SAR0–SAR4, address bit SAR0 is the most significant, and with respect to the address bits for the bit lines address bit SAR5 is the most significant and address bit SAR9 is the least significant. When some of the address bits go high, the gates of some of transistors T4–T8 in decoder DEC–W14 may go high. If one of bits SAR0 and SAR4 is high, a high potential is extended directly to the gate of transistor T4 or the gate of transistor T8. Depending on the input address, it it possible that none of the five transistors in a particular decoder will conduct. But in any decoder in which at least one transistor turns on with the application of the input address signals, the node capacitance at conductor 12 is discharged through the conducting transistor.

The first signals which are generated during any cycle are those representing address bits (see FIG. 7). If bit SAR3 is high, the charge stored in the node capacitance at the gate of transistor T3 discharges through transistor T1. When the enable signal then goes high, it is not extended through transistor T3 to conductor $\overline{SAR3}$ and thus gate T7 in decoder DEC–W14 is not turned on. On the other hand, if bit SAR3 is low, the initial high potential at the gate of transistor T3 is not discharged through transistor T1. When the enable signal goes high, since transistor T3 is gated on, the enable potential is extended through the transistor to conductor $\overline{SAR3}$ and the gate of transistor T7. Transistor T7 conducts and the node capacitance at the gate of transistor T9 discharges through transistor T7 to ground.

Those transistors such as transistor T8 which have their gates connected directly to the input address conductors are gated on only if the respective address bits are high. It is apparent that conductor 12 in decoder DEC–W14, which is initially high, remains high after the enable signal is generated only if the word line address is 01110 (decimal 14). Only if address bits SAR0 and SAR4 are low do transistors T4 and T8 remain off and only if address bits SAR1, SAR2 and SAR3 are high do transistors T5, T6 and T7 remain off when the enable signal is generated. In all cases, conductor 12 in only one of decoders DEC–W0 through DEC–W31 remains high. It is thus apparent why it is necessary for conductor 12 to be at a high level as a result of charge stored on the node capacitance at the start of each cycle — it is only in the unselected decoders that conductor 12 is forced to go low; in the selected decoder the conductor stays at a high potential (after the node capacitance is initially charged) to control the driving of the respective word line when the CS conductor goes high. It is also apparent why it is necessary for the gate of transistor T3 to be high at the start of each cycle (and for the gate of the equivalent transistor in each of the other inverters to be high at the start of each cycle). It is the high potential at the gate of transistor T3 which causes conductor $\overline{SAR3}$ to go high when the enable signal is generated unless transistor T1 has been turned on by the SAR3 signal to cause the gate of transistor T3 to go low. If bit SAR3 is a 0, transistor T1 does not turn on and in order for transistor T3 to turn on there must be a high potential at its gate at the start of the cycle.

The SAR0–SAR9 signals in FIG. 7 are shown as going high during the first 160 nanoseconds of each cycle. The dashed line is shown to indicate that some of the address signals are low depending on the cell to be selected. After the enable signal goes high, the gate of the output transistor T9 in only one of the 32 word line decoders is left high in potential and similar remarks apply to the 32 bit line decoders. When the CS conductor goes high, if the gate of transistor T9 is high, transistor T9 extends the high potential on conductor CS to word line WL14. Similarly, the high potential on conductor CS is extended to the selected one of bit lines BL -BL31.

During the time that the CS signal is high (at its maximum level in FIG. 7) it is possible that the CS lines in other chips in the same system may not go high; thus, a dashed line in the CS waveform is also shown in FIG. 7. This is because in a complete system only those chips containing bits in the word to be operated upon are selected by having their CS inputs go high. It is for this reason the the CS line in some chips may go high while the CS line in others may not during the first (select) phase of the select/refresh signal during each cycle. As will be described below, the lower level 100-nanosecond pulse in the overall CS signal is present on all CS lines (extended to all chips) in the system when the cells are to be refreshed; in this way, all of the cells in the entire memory system can be refreshed at the same time since it is the 100-nanosecond pulse which accomplishes the refresh function.

During reading or writing, the selected cell is automatically refreshed. In the case of writing, it is apparent that the cell is refreshed because the node potentials are forced to go low or high. But even during reading the selected cell is refreshed. As described above, a typical sense amplifier functions to apply opposite potentials through effective resistances to the two output conductors of the chip array. Currents flow from the sense amplifiers through the output conductors and the selected bit/sense conductors to recharge the selected cell in the same way that currents which flow through these latter conductors when transistors such as transistors T15 and T16 are gated on refresh the cells. But the other, unselected cells must be refreshed in the event they are not selected for reading or writing within that time interval during which the capacitance connected to the high voltage node would discharge to a level which would effectively result in the loss of the bit information. To refresh the cells, after the address bit signals and the enable signal have gone low, as shown in FIG. 7 the CS conductor is made to go high. Even in those chips which are not selected for reading or writing (for which the initial portion of the CS signal remains low), an intermediate level CS pulse is generated. The refresh pulse is generated together with the restore (R) pulse.

The restore conductor is connected to the gate of transistor T10 and thus a 10-volt potential is extended through transistor T10 to the gate of transistor T9. None of the decode transistors in the decoders conduct at this time because the address signals are all low and the complement address lines are also low (the R pulse turns on transistor T2 to extend a 10-volt potential to the gate of transistor T3, and since the enable signal is low transistor T3 extends a ground signal to its complement address output conductor). This operation takes place in all 64 decoders. Consequently, transistor T9 and the other 63 transistors connected to the word and bit lines all turn on and the CS pulse is extended to all of the word lines and to all of the bit lines. The fact that the bit lines go high at this time is of no moment — although gates T17 and T18 and a similar pair of gates in each of the other 31 bit lines turn on, any signals which appear on output conductors BD/SA–1 and BD/SA–0 are ignored by the sense amplifier. What is important to note is that each of the 32 word lines is forced to go high when the CS pulse is generated and similarly the R pulse occurring at the same time causes the gates such as T15 and T16 to turn on. It is at this time that all of the cells are refreshed. One-hundred nanoseconds are allowed for the cells to refresh, after which the CS signal goes low. The restore signal remains high for an additional 70 nanoseconds. Although the word lines go low after the termination of the CS signal and the cells are no longer recharging, the restore signal is still required to prevent the voltage levels on the sense lines and gates of transistors T3 and T9 from being partly discharged when the word lines go low. The partial discharge would occur due to the capacitive coupling between the word lines and these nodes. By maintaining an active low impedance device connected between these nodes and the charging sources, the devices being made active by the restore signal, a negligable voltage loss will be realized. It will be recalled that it was assumed that the potential at each of these gates was high at the start of each cycle. It is now apparent that this is accomplished by the restore pulse at the end of each cycle—transistor T2 turns on to extend a 10-volt potential to the gate of transistor T3 and transistor T10 similarly turns on (while transistors T4–T8 are off) to extend a 10-volt potential to conductor 12.

It is important to note that it is not necessary to refresh the cells during every cycle. The refresh portion of each 400-nanosecond cycle is 100 nanoseconds in duration. It is only necessary to refresh the cells once approximately every 30 cycles. During the other cycles, the CS pulse terminates at the end of the high-level portion and the restore pulse is only 70 nanoseconds in width. The restore pulse is necessary to precharge the capacitance at the gate of transistor T3 and the gate of transistor T9 in the inverters and the decoders. But since the refresh pulse (the lower portion of the CS signal) is not required during every cycle, the cycle time can be reduced to 300 nanoseconds during those cycles in which a refresh function is not necessary.

It is important to understand why the refresh pulse portion of each CS signal (when it exists in every 30th cycle or so) is at a lower level than the initail (select) portion of the signal. In the illustrative embodiment of the invention, the refresh level is only two-thirds of the select level (even though only one of the word lines is pulsed by the select pulse while all word lines are pulsed by the refresh pulse). When the 32 gate pairs such as gate pairs T15 and T16 turn on with the generation of the restore pulse, currents flow through all of the bit/sense conductors. At the same time, all 2048 gates such as T11 and T12 are turned on. If node 18 is low in potential it is because transistor T13 is on, and a large current flows through transistors T11 and T13 to ground from conductor BD/SA–0(0). At the same time, because transistor T14 is off, a relatively low current flows through transistor T12 to refresh the capacitance at node 20. The "worst case" is where 31 of the transistors coupled to one of the bit/sense conductors are on. Suppose, for example, that all of the transistors in bit line 0 equivalent to transistor T13 — but not including transistor T13 — are on. In other words, all of the cells in bit line 0 are in the 1 state except the cell in word line 14. In such a case, a very large current flows through conductor B/S–0(0) and there may be a considerable potential drop across transistor T15. In effect, instead of a 5-volt potential being extended through transistor T11 to recharge the capacitance at node 18, a lower potential is extended to this node. With such a large current flowing through conductor B/S–0(0) it would ordinarily be necessary for transistor T15 to be large enough to pass the current without an appreciable potential drop appearing across it; it is necessary that the potential on conductor B/S–0(0) be above the minimum voltage level required by the one "off" active device (transistor T13) of all those devices coupled to conductor B/S–0(0). RAther than to form very large gating transistors T15 and T16, in accordance with our invention the word line pulse used during the refresh portion of a cycle is made lower in level than the select pulse. By reducing the word line level, the gating cells (T11 and T12) draw less current than during a read or write operation and thus the currents through the bit/sense lines are reduced. This insures that the voltage on each of the bit/sense lines is sufficient to recharge all nodes to the proper levels. While the lower potential on the word lines causes the gates such as T11 and T12 to conduct less current and therefore requires a longer refresh pulse than would be required were the gates turned fully on, the increased time required to charge the nodes of the "off" active devices is insignificant when compared to the overall cycle time. The use of the lower refresh level eliminates the need for very large devices for the gates such as T15 and T16.

There is another reason for using refresh levels which are lower than the select levels. This can be understood with reference to FIG. 8 which depicts the cell which includes transistors T11–T14, together with certain of the parasitic capacitances which are always present in MOS circuits. The two capacitances which enter into the consideration are capacitances 22 and 24 (and similar capacitances between the source and gate of transistor T11, and the drain of transistor T13 and ground). During the refresh operation, gate T12 is held on by the positive potential on word line WL14. Current flows from conductor B/S–0(1) through transistor T12 to node 20. The current is shorted through transistor T14 to ground if transistor T14 is on and transistor T13 is off, or it charges capacitance 24 if transistor T14 is off and transistor T13 is on. Capacitances 22 and 24 form a voltage divider and the potential on conductor WL14 relative to ground appears across the two capacitors. Assuming that transistor T14 is off and node 20 is charged to a high potential, when the refresh pulse terminates it should have as little a discharge effect upon the node as possible. As the word line voltage drops, a negative step is transmitted through capacitances 22 and 24. The negative step reduces the voltage level at node 20. The lower the refresh pulse level on conductor WL14, the less capacitance 24 is discharged at the termination of the refresh cycle. Furthermore, the magnitude of capacitance 22 increases with the gate potential of transistor T12. The greater the gate potential, the greater the magnitude of capacitance 22 relative to the magnitude of capacitance 24. As capacitance 22 increases relative to capacitance 24, a greater portion of the negative step on word line WL14 appears across capacitance 24. Thus a large negative step on word line Wl14 at the end of the refresh cycle tends to decrease the node voltage in two ways. First, the negative step appears across capacitances 22 and 24, with the step across capacitance 24 tending to discharge node 20. Second, the greater the refresh level, the greater the portion of the negative step taken by capacitance 24 and therefore the greater the discharge of node 20. The less the voltage on node 20 at the end of each refresh cycle, the lower the cell immunity to noise pulses and the shorter the allowable time between refresh cycles. For this reason it is desirable to limit the magnitude of the refresh pulse on all word lines. Of course, some minimum pulse magnitude is required; the pulse magnitude must be equal to at least the desired node voltage plus the threshold voltage level of transistor T12. The refresh pulse magnitude should be only slightly greater than this minimum value.

A third advantage of the use of low-magnitude refresh pulses is that less power is dissipated in the array chip during each refresh cycle than would be dissipated were a refresh pulse as large as a select pulse utilized.

Capacitance effects similar to those analyzed with respect to FIG. 8 require a more detailed analysis of the operation of the inverters, FIG. 6 shows inverter I3 together with three effective capacitances which must be considered: gate-to-source capacitance C1, gate-to-drain capacitance C2, and drain-to-ground capacitance C3 (the latter includes the capacitance introduced by complement address line SAR3). Toward the end of each read/write cycle, the input address line SAR3 is held down (along with all other input address lines), the E level is down, and the R line is pulsed positive, charging the various capacitances so that the gate of transistor T3 is held at approximately 7 volts (supplied by the 10-volt source connected to the drain of transistor T2). When the R pulse terminates at the end of the cycle, conductor 10 remains at a 7-volt level awaiting the next input. At the start of the next read/write cycle, an address input is applied to the gate of transistor T1. If the address line is positive, the capacitances rapidly discharge through transistor T1 so that when the E pulse is generated transistor T3 remains non-conducting and output conductor SAR3 is not pulsed. If, however, the address input line is at a down level, then the gate of transistor T3 remains charged to 7 volts, and transistor T1 remains off with transistor T2, while only transistor T3 is biased on. When the positive E pulse is generated, current is capacitively coupled to the gate of transistor T3 through both capacitance C1 and capacitance C2, with the result that the gate is driven more positive. Thus transistor T3 remains strongly biased on, charging the output node capacitance C3 to the E level. When the position E pulse is terminated, the same action quickly discharges the output node to ground through the E line (that is, through capacitances C1 and C2). At the end of the address pulse, the positive R pulse is again applied to the gate of transistor T2, and the gate of transistor T3 is restored to 7 volts.

The regenerative inverter has several advantages over a conventional source follower circuit: (a) the output up level is set by the level of the E input, and does not vary with the threshold voltage of transistor T3; (b) the output rise time is nearly linear, since the gate-to-source bias on transistor T3 remains well above the threshold voltage throughout the transition; and (c) the same high conductance output device can be used to both charge and discharge the load capacitance C3. Since the leakage current from the gate of transistor T3 during a cycle is negligible, the final potential of the gate, and thus the output drive current, is determined by the capacitor divider action of the gate-to-source, gate-to-drain, and gate-to-substrate (not shown) capacitances associated with device T3. Any of these capacitances can be artificially increased to optimize the circuit operation.

The operations of the decoders are similar to the operations of the inverters just described, with the bi-level select/refresh signal replacing the E input. The only difference is that at most a single word line is selected to the higher (select) level during the read/write portion of the cycle, while all word lines are selected to the lower (refresh) level during the restore portion of the cycle. Transistor T9 in each of the decoders is deliberately made to have a large capacitance between the gate and the output node connected to the respective word line. The cell input devices are biased to a low impedance to provide maximum sense current during read-out and to a higher impedance to reduce the power dissipation and maintain the necessary sense line voltage during the restore operation.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. A dynamic MOS memory array chip comprising a plurality of word lines, a plurality of bit lines each having a pair of bit/sense conductors, a plurality of four-device cells disposed at the intersections of said word lines and said bit lines, each of said cells including a pair of cross-coupled devices defining two nodes and a pair of gating devices, each of said gating devices having its source and drain connected between a respective one of said nodes and one of the respective bit/sense conductors and having its gate connected to the respective word line, a plurality of means for pulsing respective ones of said word lines, a pair of output conductors, a plurality of means for connecting the two conductors in only one of said bit lines to said pair of output conductors during a read or write operation, means for controlling the operation of only one of said pulsing means during a read or write operation and for controlling the operation of all of said pulsing means simultaneously for refreshing all of the cells in the array at the same time, a potential source, a plurality of pairs of gating means each coupling said potential source to the two bit/sense conductors in a respective one of said bit lines, and means for gating on all of said pairs of gating means when all of said pulsing means operate simultaneously to refresh all of the cells in said array at the same time, said controlling means being operative, during a refresh operation, to cause said pulsing means to pulse all of said word lines at a first level and, during a read or write operation to cause one of said pulsing means to pulse only one of said word lines at a second, higher level.

2. A dynamic MOS memory array chip in accordance with claim 1 wherein each of said pulsing means includes an output transistor having its source connected to the respective word line, and said controlling means includes a common conductor connected to the drain of all of the pulsing means output transistors, means for discharging the node capacitances at the gates of all of said pulsing means output transistors except one prior to a read or write operation, a high pulse level on said common conductor thereby being transmitted through only one pulsing means output transistor to only one word line, and means for charging all of said node capacitances prior to a refresh operation and following a read or write operation, a low pulse level on said common conductor thereby being transmitted through all of said pulsing means output transistors to all of said word lines.

3. A dynamic MOS memory array chip in accordance with claim 2 wherein said charging means includes a source of potential, a plurality of transistors each having its source and drain connected between said source of potential and the gate of a respective one of said pulsing means output transistors, and means for simultaneously energizing the gates of all of the transistors in said plurality.

4. A dynamic MOS memory array chip in accordance with claim 1 wherein said controlling means is selectively operative to cause said pulsing means to pulse all of said word lines simultaneously during only widely separated read/write cycles.

5. A dynamic MOS memory array chip in accordance with claim 4 wherein each of said pulsing means includes an output transistor having its source connected to the respective word line, and said controlling means includes a common conductor connected to the drain of all of the pulsing means output transistors, means for discharging the node capacitances at the gates of all of said pulsing means output transistors except one prior to a read or write operation, a high pulse level on said common conductor thereby being transmitted through only one pulsing means output transistor to only one word line, and means for charging all of said node capacitances prior to a refresh operation and following a read or write operation, a low pulse level on said common conductor thereby being transmitted through all of said pulsing means output transistors to all of said word lines.

6. A dynamic MOS memory array chip in accordance with claim 5 wherein said charging means includes a source of potential, a plurality of transistors each having its source and drain connected between said source of potential and the gate of a respective one of said pulsing means output transistors, and means for simultaneously energizing the gates of all of the transistors in said plurality.

7. A dynamic MOS memory array chip in accordance with claim 6 wherein the operation of said means for gating on all of said pairs of gating means is controlled by said energizing means.

8. A dynamic MOS memory array chip comprising a plurality of word lines, a plurality of bit lines, a plurality of memory cells disposed at the intersections of said word lines and said bit lines, each of said cells including charge storage means and gating means for coupling the charge storage means to the respective bit line when the respective word line is pulsed, a plurality of means for pulsing respective ones of said word lines, output conductor means, a plurality of means for connecting only one of said bit lines to said output conductor means during a read or write operation, means for controlling the operation of only one of said pulsing means during a read or write operation and for controlling the operation of all of said pulsing means simultaneously for refreshing the charge storage means in all of the cells in the array at the same time, a potential source, a plurality of means for coupling said potential source to said bit lines, and means for operating all of said coupling means when all of said pulsing means operate simultaneously to refresh the charge storage means in all of the cells in said array at the same time, said controlling means being operative, during a refresh operation, to cause said pulsing means to pulse all of said word lines at a first level and, during a read or write operation, to cause one of said pulsing means to pulse only one of said word lines at a second, higher level.

9. A dynamic MOS memory array chip in accordance with claim 8 wherein said controlling means is selectively operative to cause said pulsing means to pulse all of said word lines simultaneously during only widely separated read/write cycles.

10. A dynamic MOS memory array chip in accordance with claim 9 wherein each of said pulsing means includes an output transistor having its source connected to the respective word line, and said controlling means includes a common conductor connected to the drain of all of the pulsing means output transistors, means for discharging the node capacitances at the gates of all of said pulsing means output transistors except one prior to a read or write operation, a high pulse level on said common conductor thereby being transmitted through only one pulsing means output transistor to only one word line, and means for charging all of said node capacitances prior to a refresh operation and following a read or write operation, a low pulse level on said common conductor thereby being transmitted through all of said pulsing means output transistors to all of said word lines.

11. A dynamic MOS memory array chip in accordance with claim 10 wherein said charging means includes a source of potential, a plurality of transistors each having its source and drain connected between said source of potential and the gate of a respective one of said pulsing means output transistors, and means for simultaneously energizing the gates of all of the transistors in said plurality.

12. A dynamic MOS memory array chip in accordance with claim 11 wherein the operation of said means for coupling said potential source to said bit lines is controlled by said energizing means.

13. A dynamic MOS memory array chip comprising a plurality of word lines, a plurality of bit lines each having a pair of bit/sense conductors, a plurality of four-device cells disposed at the intersections of said word lines and said bit lines, each of said cells including a pair of cross-coupled devices defining two nodes and a pair of gating devices, each of said gating devices having its source and drain connected between a respective one of said nodes and one of the respective bit/sense conductors and having its gate connected to the respective word line, a plurality of means for pulsing respective ones of said word lines, a pair of output conductors, a plurality of means for connecting the two conductors in only one of said bit lines to said pair of output conductors during a read or write operation, and means for controlling the pulsing of a word line by the respective one of said pulsing means at a first level during a read or write operation and for controlling the pulsing of the word line by the respective one of said pulsing means at a second, lower level during a refresh operation.

14. A dynamic MOS memory array chip in accordance with claim 13 further including a potential source, a plurality of pairs of gating means each coupling said potential source to the two bit/sense conductors in a respective one of said bit lines, and means for gating on the pair of gating means associated with any bit line when the cells in that bit line are to be refreshed.

15. A dynamic MOS memory array chip in accordance with claim 14 wherein said controlling means is selectively operative to cause said pulsing means to pulse all of said word lines at said second, lower level during only widely separated read/write cycles.

16. A dynamic MOS memory array chip in accordance with claim 15 wherein each of said pulsing means includes an output transistor having its source connected to the respective word line, and said controlling means includes a common conductor connected to the drain of all of the pulsing means output transistors, means for discharging the node capacitances at the gates of all of said pulsing means output transistors except one prior to a read or write operation, a high pulse level on said common conductor thereby being transmitted through only one pulsing means output transistor to only one word line, and means for charging all of said node capacitances prior to a refresh operation and following a read or write operation, a low pulse level on said common conductor thereby being transmitted through all of said pulsing means output transistors to all of said word lines.

17. A dynamic MOS memory array chip in accordance with claim 16 wherein said charging means includes a source of potential, a plurality of transistors each having its source and drain connected between said source of potential and the gate of a respective one of said pulsing means output transistors, and means for simultaneously energizing the gates of all of the transistors in said plurality.

18. A dynamic MOS memory array chip in accordance with claim 17 wherein the operation of said means for gating on pairs of said gating means is controlled by said energizing means.

19. A dynamic MOS memory array chip in accordance with claim 13 wherein said controlling means is selectively operative to cause said pulsing means to pulse all of said word lines at said second, lower level during only widely separated read/write cycles.

20. A dynamic MOS memory array chip in accordance with claim 19 wherein each of said pulsing means includes an output transistor having its source connected to the respective word line, and said controlling means includes a common conductor connected to the drain of all of the pulsing means output transistors, means for discharging the node capacitances at the gates of all of said pulsing means output transistors except one prior to a read or write operation, a high pulse level on said common conductor thereby being transmitted through only one pulsing means output transistor to only one word line, and means for charging all of said node capacitances prior to a refresh operation and following a read or write operation, a low pulse level on said common conductor thereby being transmitted through all of said pulsing means output transistors to all of said word lines.

21. A dynamic MOS memory array chip in accordance with claim 20 wherein said charging means includes a source of potential, a plurality of transistors each having its source and drain connected between said source of potential and the gate of a respective one of said pulsing means output transistors, and means for simultaneously energizing the gates of all of the transistors in said plurality.

22. A dynamic MOS memory array chip in accordance with claim 21 wherein said controlling means is selectively operative to cause said pulsing means to pulse all of said word lines at said second, lower level during only widely separated read/write cycles.

23. A dynamic MOS memory array chip in accordance with claim 13 wherein each of said pulsing means includes an output transistor having its source connected to the respective word line, and said controlling means includes a common conductor connected to the drain of all of the pulsing means output transistors, means for discharging the node capacitances at the gates of all of said pulsing means output transistors except one prior to a read or write operation, a high pulse level on said common conductor thereby being transmitted through only one pulsing means output transistor to only one word line, and means for charging all of said node capacitances prior to a refresh operation and following a read or write operation, a low pulse level on said common conductor thereby being transmitted through all of said pulsing means output transistors to all of said word lines.

24. A dynamic MOS memory array chip in accordance with claim 23 wherein said charging means includes a source of potential, a plurality of transistors each having its source and drain connected between said source of potential and the gate of a respective one of said pulsing means output transistors, and means for simultaneously energizing the gates of all of the transistors in said plurality.

25. A dynamic MOS memory array chip comprising a plurality of word lines, a plurality of bit lines, a plurality of memory cells disposed at the intersections of said word lines and said bit lines, each of said cells including charge storage means and gating means for coupling the charge storage means to the respective bit line when the respective word line is pulsed, a plurality of means for pulsing respective ones of said word lines, output conductor means, a plurality of means for connecting only one of said bit lines to said output conductor means during a read or write operation, and means for controlling the pulsing of a word line by the respective one of said pulsing means at a first level during a read or write operation and for controlling the pulsing of the word line by the respective one of said pulsing means at a second lower, level during a refresh operation.

26. A dynamic MOS memory array chip in accordance with claim 25 further including a potential source, a plurality of means for coupling said potential source to said bit lines, and means for operating the coupling means associated with any bit line when the cells in that bit line are to be refreshed.

27. A dynamic MOS memory array chip in accordance with claim 26 wherein said controlling means is selectively operative to cause said pulsing means to pulse all of said word lines at said second, lower level during only widely separated read/write cycles.

28. A dynamic MOS memory array chip in accordance with claim 27 wherein each of said pulsing means includes an output transistor having its source connected to the respective word line, and said controlling means includes a common conductor connected to the drain of all of the pulsing means output transistors, means for discharging the node capacitances at the gates of all of said pulsing means output transistors except one prior to a read or write operation, a high pulse level on said common conductor thereby being transmitted through only one pulsing means output transistor to only one word line, and means for charging all of said node capacitances prior to a refresh operation and following a read or write operation, a low pulse level on said common conductor thereby being transmitted through all of said pulsing means output transistors to all of said word lines.

29. A dynamic MOS memory array chip in accordance with claim 28 wherein said charging means includes a source of potential, a plurality of transistors each having its source and drain connected between said source of potential and the gate of a respective one of said pulsing means output transistors, and means for simultaneously energizing the gates of all of the transistors in said plurality.

30. A dynamic MOS memory array chip in accordance with claim 29 wherein the operation of said means for coupling said potential source to said bit lines is controlled by said energizing means.

31. A dynamic MOS memory array chip in accordance with claim 25 wherein said controlling means is selectively operative to cause said pulsing means to pulse all of said word lines at said second, lower level during only widely separated read/write cycles.

32. A dynamic MOS memory array chip in accordance with claim 31 wherein each of said pulsing means includes an output transistor having its source connected to the respective word line, and said controlling means includes a common conductor connected to the drain of all of the pulsing means output transistors, means for discharging the node capacitances at the gates of all of said pulsing means output transistors except one prior to a read or write operation, a high pulse level on said common conductor thereby being transmitted through only one pulsing means output transistor to only one word line, and means for charging all of said node capacitances prior to a refresh operation and following a read or write operation, a low pulse level on said common conductor thereby being transmitted through all of said pulsing means output transistors to all of said word lines.

33. A dynamic MOS memory array chip in accordance with claim 32 wherein said charging means includes a source of potential, a plurality of transistors each having its source and drain connected between said source of potential and the gate of a respective one of said pulsing means output transistors, and means for simultaneously energizing the gates of all of the transistors in said plurality.

34. A dynamic MOS memory array chip in accordance with claim 33 wherein the operation of said means for coupling said potential source to said bit lines is controlled by said energizing means.

35. A dynamic MOS memory array chip in accordance with claim 25 wherein each of said pulsing means includes an output transistor having its source connected to the respective word line, and said controlling means includes a common conductor connected to the drain of all of the pulsing means output transistors, means for discharging the node capacitances at the gates of all of said pulsing means output transistors except one prior to a read or write operation, a high pulse level on said common conductor thereby being transmitted through only one pulsing means output transistor to only one word line, and means for charging all of said node capacitances prior to a refresh operation and following a read or write operation, a low pulse level on said common conductor thereby being transmitted through all of said pulsing means output transistors of all of said word lines.

36. A dynamic MOS memory array chip in accordance with claim 35 wherein said charging means includes a source of potential, a plurality of transistors each having its source and drain connected between said source of potential and the gate of a respective one of said pulsing means output transistors, and means for simultaneously energizing the gates of all of the transistors in said plurality.

37. A dynamic MOS memory array chip in accordance with claim 36 wherein the operation of said means for coupling said potential source to said bit lines is controlled by said energizing means.

38. A dynamic MOS memory array chip comprising a plurality of word lines, a plurality of bit lines each having a pair of bit/sense conductors, a plurality of four-device cells disposed at the intersections of said word lines and said bit lines, each of said cells including a pair of cross-coupled devices defining two nodes and a pair of gating devices, each of said gating devices having its source and drain connected between a respective one of said nodes and one of the respective bit/sense conductors and having its gate connected to the respective word line, a plurality of means for pulsing respective ones of said word lines, a pair of output conductors, a plurality of means for connecting the two conductors in only one of said bit lines to said pair of output conductors during a read or write operation, means for controlling the pulsing of a word line by the respective one of said pulsing means during a read or write operation, or during a refresh operation, a potential source, a plurality of pairs of gating means each coupling said potential source to the two bit/sense conductors in a respective one of said bit lines, and means for gating on the pair of gating means associated with any bit line when the cells in that bit line are to be refreshed.

39. A dynamic MOS memory array chip comprising a plurality of word lines, a plurality of bit lines, a plurality of memory cells disposed at the intersections of said word lines and said bit lines, each of said cells including charge storage means and gating means for coupling the charge storage means to the respective bit line when the respective word line is pulsed, a plurality of means for pulsing respective ones of said word lines, output conductor means, a plurality of means for connecting only one of said bit lines to said output conductor means during a read or write operation, and means for controlling the operation of only one of said pulsing means during a read or write operation and for controlling the operation of all of said pulsing means simultaneously for refreshing the charge storage means in all of the cells in the array at the same time, said controlling means being operative, during a refresh operation, to cause said pulsing means to pulse all of said word lines at a first level and, during a read or write operation, to cause one of said pulsing means to pulse only one of said word lines at a second, higher level.

* * * * *